July 9, 1940.   S. S. GREEN   2,206,887
WATT-HOUR METER WITH GAP CENTERING ADJUSTMENTS
Filed Feb. 16, 1938   2 Sheets-Sheet 1
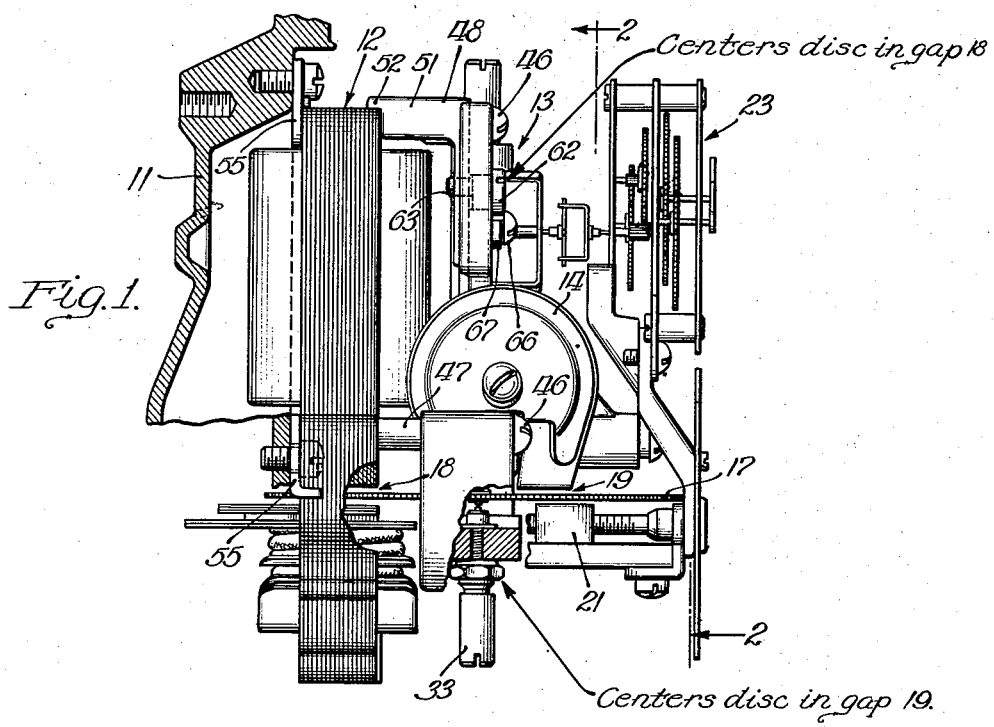
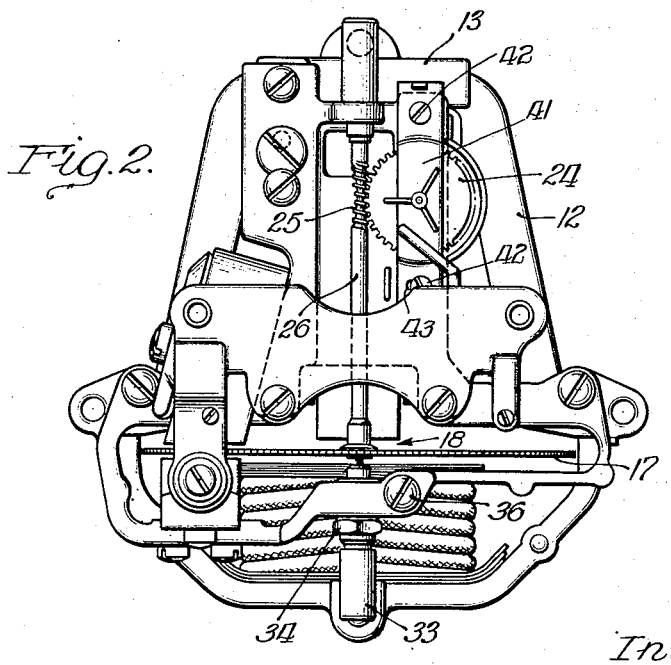
Inventor:
Stanley S. Green
By: Louis Robertson
Atty.

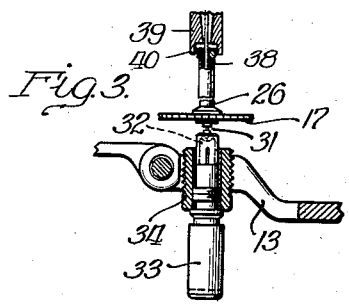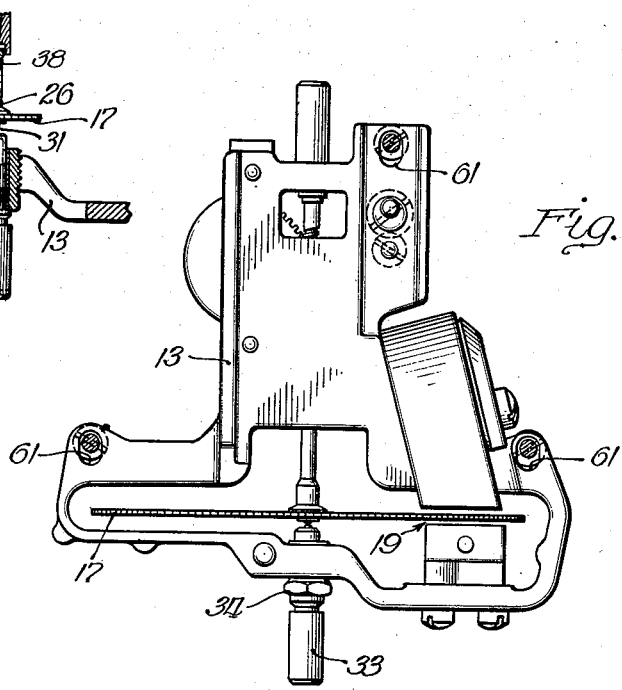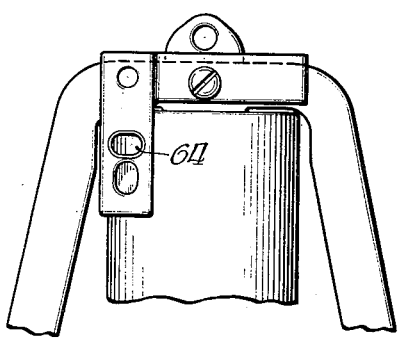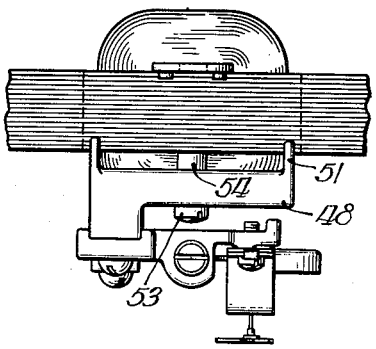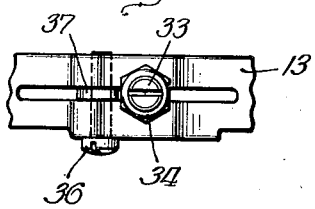

Patented July 9, 1940

2,206,887

UNITED STATES PATENT OFFICE 2,206,887

WATT-HOUR METER WITH GAP CENTERING ADJUSTMENTS

Stanley S. Green, La Fayette, Ind., assignor to Duncan Electric Manufacturing Company, La Fayette, Ind., a corporation of Illinois Application February 16, 1938, Serial No. 190,724

11 Claims. (Cl. 171—264)

This invention relates to watt-hour meters and has been illustrated as embodied in a meter in which the rotating disc can be centered both in the damping magnet gap and in the driving magnet gap. In some of its aspects it relates broadly to the centering of a moving member within a gap.

It has long been recognized that there are advantages from the use of narrow magnet gaps in watt-hour meters. With any given magnet the strength or density of the magnetic flux which passes through the disc will depend largely on the length of the air gap within the magnetic circuit. In other words, as the gap is made more narrow, the magnet can force more magnetic flux across it, or the magnet may be made smaller or less powerful without decreasing the flux. In the case of the permanent damping magnet the use of a smaller magnet because a shorter gap is used saves weight, saves the cost of the material and, sometimes even more important, saves space. In the case of the electromagnetic driving unit there are the same advantages and in addition there are other advantages. The use of a smaller gap in the core structure and hence fewer ampere turns in the coil permits the coils to have a higher ratio of useful inductance to harmful resistance resulting in less power loss, less heat generation, and a better phase lag. In other words, with any given set of magnets the gaps could not be widened without decreasing the flux passing through the disc and hence decreasing the torque with which the disc is driven and not only necessitating a different gearing ratio with the register but decreasing accuracy of the meter especially on light load measurements.

It is theoretically possible to make the gap length only slightly greater than the thickness of the disc. Inasmuch, however, as the meters must be produced in large quantities and at extremely low cost it is not commercially practical to reach this theoretically perfect result. As a matter of fact, most manufacturers have used very wide gaps heretofore in order to avoid manufacturing difficulties. According to the present invention a meter is provided in which relatively narrow gaps can be used without the manufacturing difficulties which have been experienced heretofore when such narrow gaps were used. Furthermore, still narrower gaps could be used, although of course if the gaps are reduced to the extreme, manufacturing difficulties will again appear. The advantages of narrow gaps substantially without manufacturing difficulties are obtained by providing extremely simple and easily operated structure for centering the disc within the gaps.

Although the structure is simple, its development was not. In the first place every meter includes at least two gaps, that formed by the electromagnetic driving unit and that formed by the permanent magnet damping unit. Since these gaps are independent, there are invariably commercial variations in their relative positions with the result that a disc centered in one gap would not usually be centered in the other. Therefore, it was necessary to provide adjustment of one gap with respect to the other. Furthermore, the disc must drive a meter register through suitable gearing and this presented the difficulty of either moving all of the gearing with the centering movement of the disc or making some compensating provision. One of the greatest difficulties was in connection with the desirability of being able to separate the major portions of the meter from one another and put them back together without changing the meter accuracy and therefore without losing the gap centering adjustments. This desirability alone has probably been enough to keep many people from even considering the provision of adjustable gap centering in meters. The simplicity of assembly is so important that gap centering adjustments would have seemed repugnant to any meter specialist considering it. These difficulties have been overcome by so constructing the adjustment means that the adjustments are easily made and once made may be retained indefinitely even though the meter is taken apart.

The objects and advantages of the invention will be for the most part apparent from the foregoing discussion. Additional objects and advantages will be apparent from the following description and from the drawings, in which:

Fig. 1 is a side elevation of the meter chosen for illustration of the invention, only a fragment of the base being shown, and other portions being broken away for the sake of clarity.

Fig. 2 is a front elevation of the meter mechanism seen in Fig. 1 with portions removed for the sake of clarity.

Fig. 3 is a fragmentary sectional view showing the adjustment of the disc with respect to the frame and hence with respect to the gap of the permanent magnet.

Fig. 4 is a view of the rear side of the frame showing a portion of the means for adjusting the frame with respect to the driving unit and hence adjusting the centering of the disc within the gap of the driving unit.

Fig. 5 is a fragmentary view of the front of the driving unit with a coupling thereon to engage the structure seen in Fig. 4.

Fig. 6 is a fragmentary view of the top of the mechanism seen in Fig. 1.

Fig. 7 is a fragmentary view of the bottom of the detail shown in Fig. 3.

Although this invention may take many forms, only one has been chosen for illustration. In this form the invention is illustrated as embodied in a watt-hour meter carried by a base 11 and including a driving unit 12 secured to the base 11, a frame 13 secured to the driving unit 12, a damping magnet system 14 carried by the frame 13, and a disc 17 rotatably carried by the frame 13 and rotating through the gap 18 of the driving unit 12 and the gap 19 of the damping magnet system 14. This gap is formed between the magnet itself, to which the number 14 is applied, and the armature blocks 21. The meter also includes a register 23 which is carried by the frame 13. This register is driven through gear 24 which meshes with worm 25 on the shaft 26 of the disc 17.

Centering in damping magnet gap

The disc 17 is carried by the shaft 26 which is provided at its bottom with a pivot 31 which, as seen best in Fig. 3, rests on a jewel bearing 32 carried by a bearing holder 33. Heretofore this bearing member 33 has screwed directly into the meter frame but according to the present invention it screws into a bushing 34 which in turn screws into the frame 13. It is occasionally desirable to remove the holder 33 so as to clean the bearing cup 32 or to remove the disc.

In order that the holder 33 may be removed and returned to its original position, the bearing holder 33 should screw home against the bushing 34 as illustrated in Fig. 3. Thus, when it has removed it will always be screwed back to the same height and support the disc 17 at the original height. The gap centering adjustment is therefore provided by the bushing 34, it being evident that the position of this bushing determines the vertical position of the bearing holder 33 when it is driven home against the bushing 34 and thence the vertical position of the disc 17.

When the disc 17 is first applied to the frame 13, the bearing holder 33 is screwed home against the bushing 34 and the latter is adjusted until the disc 17 is centered within the gap 19. It is then desirable to lock the bushing 34 in place with substantial permanency since it will ordinarily never again need to be adjusted. Since the adjustment is permanent until there is reason to change it, it may be called "optionally permanent."

This optionally permanent locking of the bushing 34 is accomplished by means of a screw 36, the head of which is seen in Fig. 2 and the operation of which is seen best in Fig. 7. The frame 13 is split in the vicinity of the bushing 34 and the screw 36 passes through one portion of the frame and screws into the other portion so as to draw the two portions together and clamp the bushing 34 firmly. A spacing washer 37 may be provided to protect the frame against being bent by carelessly tightening screw 36 when bushing 34 is not in place.

In order for the adjustment to be made in this simple manner it is necessary for the journaling of the shaft 26 at its top to be of such nature that it need not be correspondingly adjusted as the disc 17 and shaft 26 are adjusted by the bushing 34. One conventional form of upper bearing journal is especially suitable in this combination. In this form the upper end of the shaft is provided with an axial bore into which a journal pin 38 extends, the journal pin 38 being carried by a journal pin holder 39 somewhat similar to the holder 33. The holder 39 preferably includes a flange 40 which telescopes over the top of the shaft 26 to protect both the shaft and the journal pin 38. The proportions are such as to permit all the necessary vertical movement of the shaft 26 with respect to the flange 40 and the pin 38.

To permit the gear 24 to engage the worm 25 properly in spite of adjustments of the disc and the shaft, the gear 24 is adjustable. One simple form of adjustment is to mount it in a cage 41 secured to frame 13 by screws 42, the lower of which passes through an adjustment slot 43 in cage 41.

Centering in driving magnet gap

Inasmuch as any movement of the disc to center it within gap 18 of the driving magnet must be made in such a manner that it will not disturb the centering of the disc within the gap 19 of the damping magnet system, the centering adjustment within the gap 18 is obtained by moving the entire frame 13 with respect to the driving unit 12. It must be remembered, however, that the frame 13 must, except for the adjustment, be rigidly secured to the driving unit 12 and that it should be removable and replaceable without altering the gap centering adjustment.

The normal rigid mounting of the frame 13 on the driving unit 12 is obtained by the three screws 46. The two lower screws 46 screw into posts or spacer rivets 47, and the upper screw 46 screws into bracket 48; the spacer rivets 47 and bracket 48 all being secured to the laminations of the driving unit 12. It may be observed that the two spacer posts 47 and the bracket 48 furnish three-point suspension for the frame so that there is never any danger of wabble or strain or any necessity for machine fitting. This three-point suspension is similar to the mounting utilized by the present inventor heretofore, although the bracket 48 is of a special form to aid in contributing the gap centering adjustment.

The exact manner of mounting the bracket 48 is relatively unimportant but one simple mounting arrangement is seen in Figs. 1, 5 and 6. The bracket 48 is provided with legs 51 which have toes 52 resting on the top of the laminations of the driving unit 12, the legs 51 also resting against the front face of these laminations. A screw 53 which screws into a spacer rivet 54 draws the bracket 48 tight against the laminations of driving unit 12. The toes 52 prevent any twisting of the bracket 48 about the axis of screw 53. It may be noted that both the spacer rivet 54 and the spacer rivets 47 are utilized in securing the laminations together and also in securing the attachment lugs 55 to the laminations.

The three screws 46 all pass through slots 61 in the frame 13 so that when the screws 46 are loosened the frame will not be restrained by them from a vertical movement which would adjust the position of the disc 17 in the gap 18. This vertical movement or, in other words, the gap centering adjustment is accomplished by turning the headed stud 62 on which is formed an eccentric pin 63. The pin 63 is positioned in horizontal slot 64 in the bracket 48 with the result that turning the eccentric pin 63 by a screw driver applied to the head 62 will raise and lower the frame 13 and with it the disc 17. Inasmuch as the adjustments should always be made when the screws 46 are sufficiently loose to let gravity cause the frame to slide down as far as the eccentric pin 63 will permit it, there is no necessity for the pin 63 to fit snugly within the slot 64. Gravity will cause it to rest on the bottom side of this slot. The snug fit illustrated in the drawings, or at least a reasonably snug fit, is preferred to prevent improper operation or accidental displacement.

When the eccentric pin 63 has been turned to such a position that the disc 17 is centered within the gap 18, it may be locked in this position by tightening the screw 66 which bears on the head 62 of the eccentric pin 63. To permit the screw 66 to be tightened up very firmly without slipping off of the head 62, a bushing 67 may be formed on the frame 13 below and, if desired, partially around the screw 66. This bushing of course should not be quite as high as the eccentric head 62. Although the tightening of screw 66 locks the vertical adjustment of the disc 17 and hence its centering adjustment within the gap 18, the screws 46 should of course be tightened to secure the frame rigidly to the driving unit 12.

It will be observed that the centering adjustment, once having been made by turning the eccentric head 62 and locking it in the adjusted position with the screw 66, will be retained with optional permanency, that is until there is some reason to change it.

Operation

Although the operation will be clear from the foregoing description, it may be summarized for the sake of clarity. The gap centering operation is performed in two steps, first centering the disc with respect to the gap 19 in the damping magnet system, and second centering it with respect to the gap 18 in the driving unit.

To center the disc 17 in the gap 19 the screw 36 is loosened to unlock the bushing 34 and the latter is turned to screw it up or down in the frame 13 and with respect to the gap 19. When the disc 17 has thus been centered within the gap 19, the screw 36 is again tightened to lock the bushing 34 in place. Since this adjustment is made with the lower bearing holder 33 screwed home against the bushing 34, this bearing holder 33 may be removed when desired and, when returned, will always be screwed home and will therefore not affect the centering adjustment of the disc 17 in gap 19.

After the disc has been centered in gap 19, the entire frame 13, and with it the disc 17 and the members forming gap 19, is adjusted vertically to center the disc 17 in the gap 18. This is accomplished by loosening screws 46 until these screws no longer grip the frame tightly enough to keep it from sliding in a vertical direction. The screw 66 is then slightly loosened to permit the eccentric pin 63 to be turned by the application of a screw driver to the head 62. The screw 66 is preferably left tight enough to maintain some friction against the head 62 so that the latter will have no tendency to lose its adjustment, although, as a matter of fact, it probably will have enough friction even without the screw 66. As the head 62 is turned, the eccentric pin 63 resting on the bottom of slot 64 in bracket 48 raises or lowers the frame 13 and its assembly. When the disc 17 has thus been centered in the gap 18, the screw 66 is tightened to lock the eccentric pin 63 in this adjusted position with optional permanency, and the screws 46 are tightened to secure the frame 13 rigidly to the driving unit 12.

These two centering adjustments are substantially permanent to the extent that they ordinarily need never be altered even though the disc or bearing members be removed from the frame (to be cleaned, for example) and even though the frame be removed from the driving unit.

It will be observed that the constructions permitting these adjustments are extremely simple and that the adjustments themselves are made in an extremely simple manner. Because of this and because of the fact that the adjustments once made are permanent in spite of taking the meter apart, it is highly practical and desirable from the commercial standpoint to design meters with this invention incorporated therein. It will permit the use of much narrower gaps without incurring manufacturing difficulties, and even extremely narrow gaps can be employed without the manufacturing difficulties being too great.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. A watt-hour meter including a driving unit forming a driving magnet gap, a frame secured to the driving unit, a damping magnet system carried by the frame and forming a damping magnet gap, a disc rotatably carried by the frame and rotating through both of said gaps, means for supporting the disc from the frame adjustable with respect to the frame to center the disc within the damping magnet gap, said disc being removable while maintaining said adjustment therefor, and means for adjusting the relative positions of the frame and the driving unit to center the disc within the driving magnet gap, the frame being removable from the driving unit while maintaining this latter adjustment.

2. The combination of a rotating element, a main support therefor, and means for adjusting the position of the element with respect to the support, including a bushing adjustable with respect to the support and a support unit removable from the bushing but adapted to be normally secured thereto in one position only whereby the relative positions of the parts may be determined by the bushing and the support unit may be removed and returned to place while maintaining the adjustment of the bushing, said bushing being readily accessible to the application of a tool thereto for adjusting the same when the support unit is in position therein.

3. A watt-hour meter including a driving unit forming a driving magnet gap; a frame secured to the driving unit; a damping magnet system secured to the frame and forming a damping magnet gap; a disc rotatably carried by the frame and rotating through both of the gaps; means for adjustably supporting the disc with respect to the frame and the damping magnet gap including a bushing screwing into the frame, means for locking the bushing with substantial permanency in any desired position, a bearing, and a bearing holder screwing into the bushing always to the same position therein whereby the disc may be removed while maintaining the centering adjustment therefor in the damping magnet gap; and means for adjusting the position of the frame with the parts carried thereby on the driving unit whereby the disc may be centered in the driving unit gap.

4. A watt-hour meter including a driving unit forming a driving magnet gap; a frame secured to the driving unit; a damping magnet system secured to the frame and forming a damping magnet gap; a disc rotatably carried by the frame and rotating through both of the gaps; means for adjustably supporting the disc with respect to the frame and the damping magnet gap including a bushing screwing into the frame, said bushing screwing into a slotted portion of the frame provided with a screw for causing the opposite sides of the slot to engage the bushing firmly to lock it, a bearing, and a bearing holder screwing into the bushing always to the same position therein whereby the disc may be removed while maintaining the centering adjustment therefor in the damping magnet gap; and means for adjusting the position of the frame with the parts carried thereby on the driving unit whereby the disc may be centered in the driving unit gap.

5. A watt-hour meter including a driving unit forming a driving magnet gap; a frame secured to the driving unit; a damping magnet system secured to the frame and forming a damping magnet gap; a disc rotatably carried by the frame and rotating through both of the gaps; means for adjustably supporting the disc with respect to the frame and the damping magnet gap including a bushing screwing into the frame, means for locking the bushing with substantial permanency in any desired position, a bearing, and a bearing holder screwing into the bushing always to the same position therein whereby the disc may be removed while maintaining the centering adjustment therefor in the damping magnet gap; and means for adjusting the position of the frame with the parts carried thereby on the driving unit whereby the disc may be centered in the driving unit gap, said means being sufficiently independent of the means for securing the frame to the driving unit to permit the frame to be removed from the driving unit while maintaining the adjustment for centering the disc within the driving magnet gap.

6. A watt-hour meter including a driving unit forming a driving magnet gap; a frame secured to the driving unit; a damping magnet system secured to the frame and forming a damping magnet gap; a disc rotatably carried by the frame and rotating through both of the gaps; means for adjustably supporting the disc with respect to the frame and the damping magnet gap, including a bushing screwing into the frame, means for locking the bushing with substantial permanency in any desired position, a bearing, and a bearing holder screwing into the bushing always to the same position therein whereby the disc may be removed while maintaining the centering adjustment therefor in the damping magnet gap; and means for adjusting the position of the frame with the parts carried thereby on the driving unit whereby the disc may be centered in the driving unit gap, said means being sufficiently independent of the means for securing the frame to the driving unit to permit the frame to be removed from the driving unit while maintaining the adjustment for the disc within the driving magnet gap; and including an adjustment device interacting between the frame and the driving unit and adjustable with respect to one of these parts between which it interacts to determine their relative positions, and means for locking the device in any adjusted position.

7. A watt-hour meter including a driving unit forming a driving magnet gap, a frame secured to the driving unit, a damping magnet system carried by the frame and forming a damping magnet gap, a disc rotatably carried by the frame and rotating through both of said gaps, means for supporting the disc from the frame adjustable with respect to the frame to center the disc within the damping magnet gap, said disc being removable while maintaining said adjustment therefor, and frame positioning means for adjusting the relative positions of the frame and the driving unit to center the disc within the driving magnet gap, the frame being removable from the driving unit while maintaining this latter adjustment, said frame positioning means including a pin journaled in the frame and having an eccentric extension resting on the driving unit, and means for locking the pin with at least optional permanence.

8. The combination of first and second units separably secured together but requiring accurate positioning with respect to one another which does not substantially vary when the parts are separated and again secured together, and positioning means including a pin journaled in the first of the units and having an eccentric extension thereon removably engaging the second unit and means carried by the first unit for locking said pin in an adjusted position with at least optional permanence, said first unit, pin and locking means being removable from the second unit while maintaining said pin locked.

9. A watt-hour meter including a driving unit forming a driving magnet gap, a frame secured to the driving unit, a damping magnet system carried by the frame and forming a damping magnet gap, a disc rotatably carried by the frame and rotating through both of said gaps, means for supporting the disc from the frame adjustable with respect to the frame to center the disc within the damping magnet gap, said disc being removable while maintaining said adjustment therefor, and frame positioning means for adjusting the relative positions of the frame and the driving unit to center the disc within the driving magnet gap, the frame being removable from the driving unit while maintaining this latter adjustment, said frame positioning means including a pin journaled in the frame and having an eccentric extension resting on the driving unit, and a screw screwing into the frame and having a head engaging the pin with one side of the head; said frame having a portion adapted to engage the other side of the head to limit the distortion of the screw.

10. A watt-hour meter including a driving unit forming a driving magnet gap, a frame secured to the driving unit, a damping magnet system carried by the frame and forming a damping magnet gap, a disc rotatably carried by the frame and rotating through both of said gaps, means carried by the frame for adjusting the relative positions of the frame and the driving unit as a whole to center the disc within the driving magnet gap, and locking means carried by the frame for securing the adjusting means in a given adjusted position, said frame with its adjusting means and locking means being removable as a unit from the driving unit.

11. A watt-hour meter including a rotatable disc, a frame rotatably carrying the disc, a gap-forming unit forming a gap in which the disc rotates, the gap being rigidly held at a given disc-receiving length, and means for adjusting the frame with respect to the gap-forming unit to center the disc within the invariable gap, said frame and gap-forming unit being separable while maintaining the adjustment of said means to permit reassembly of the frame and unit together, with the disk automatically returned approximately to its former position in the gap.

STANLEY S. GREEN.